(No Model.)  2 Sheets—Sheet 1.
C. & C. E. HALL.
BOLT OR RIVET MACHINE.
No. 459,155.  Patented Sept. 8, 1891.
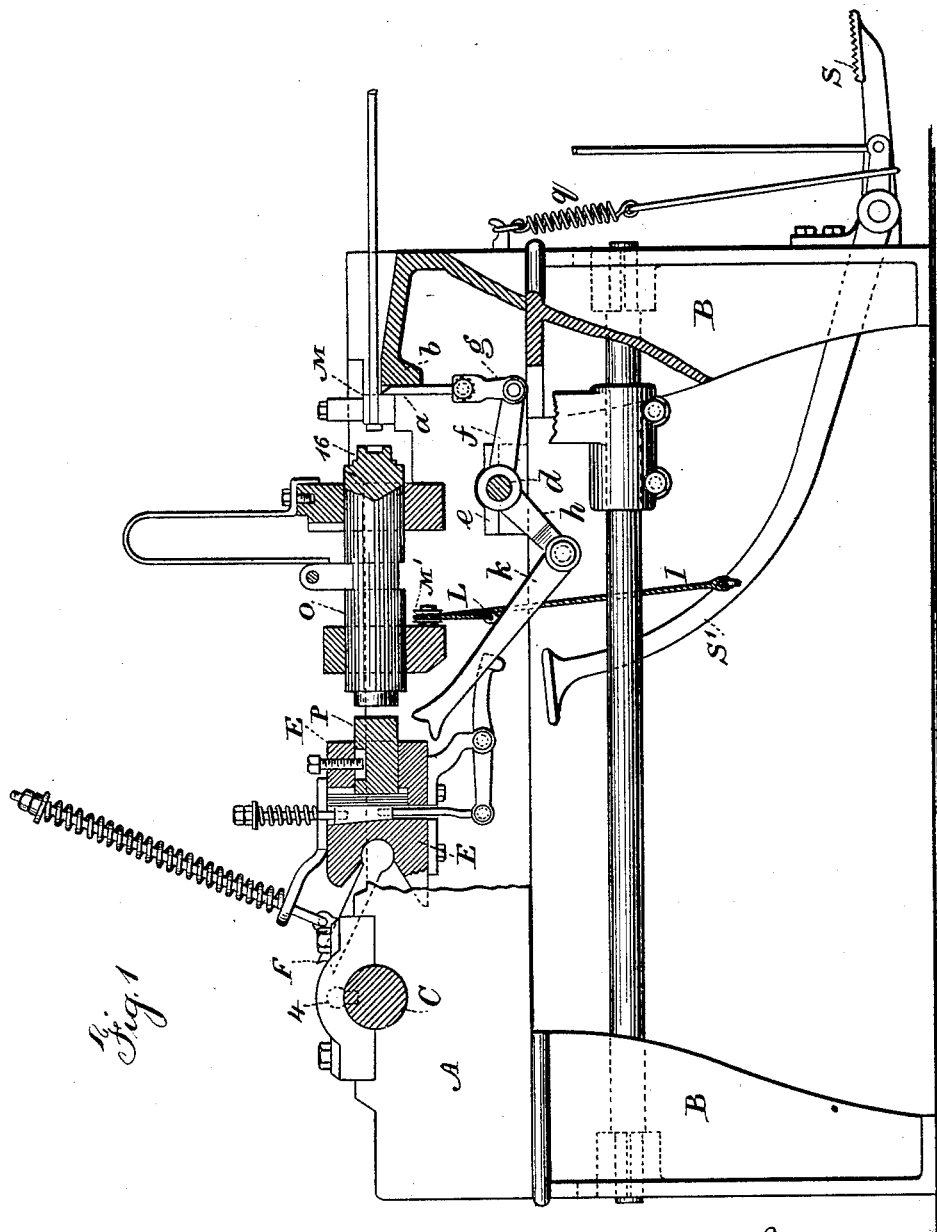
Witnesses
Chas. H. Smith
J. Staib
Inventors
Charles Hall
Charles E. Hall
Per Lemuel W. Serrell
atty (No Model.) 2 Sheets—Sheet 2.
C. & C. E. HALL.
BOLT OR RIVET MACHINE.
No. 459,155. Patented Sept. 8, 1891.
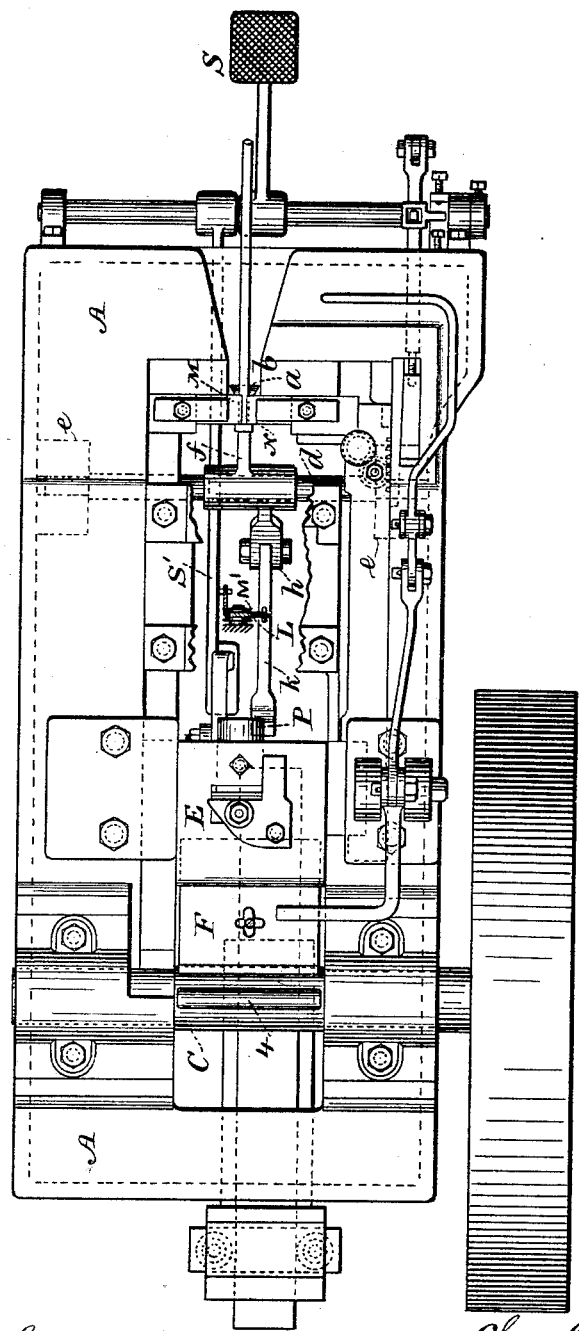

UNITED STATES PATENT OFFICE.

CHARLES HALL AND CHARLES E. HALL, OF NEW YORK, N. Y.

BOLT OR RIVET MACHINE.

SPECIFICATION forming part of Letters Patent No. 459,155, dated September 8, 1891.

Application filed May 11, 1891. Serial No. 392,270. (No model.)

*To all whom it may concern:*

Be it known that we, CHARLES HALL and CHARLES E. HALL, citizens of the United States, residing at the city, county, and State of New York, have invented an Improvement in Bolt or Rivet Machines, of which the following is a specification.

In Letters Patent No. 447,110, granted to us February 24, 1891, a machine is represented which is adapted to forging bolts and to giving a light blow for finishing the bolt and removing the fins that are formed in swaging up the head. In this machine and other bolt-machines it is usual to withdraw the bolt after the head has been forged upon it and insert such bolt into a cutter for cutting off the bolt from the rod at the proper length. In some classes of bolt or rivet machines a cutter has been made use of working in unison with the cross-head, so that the bolt or rivet is cut off in the die, but the head is forged by one blow. In our present improvements the bolt or rivet is forged by any desired number of blows and the cutting is under the control of the attendant, so as to be brought into action to sever the rod during the last movement of the heading mechanism.

We have represented our present improvements with special reference to the machine illustrated in Patent No. 447,110; but our said improvements are available with other bolt or rivet machinery, especially as hereinafter indicated.

In the drawings, Figure 1 is a diagrammatic longitudinal section of a bolt-machine with our improvements therewith connected, and Fig. 2 is a diagrammatic plan view illustrating the cutter and the holding-dies.

The frame A and legs B are of usual character, and at E a cross-head is represented, which carries the header P, and this cross-head is reciprocated by any suitable means—such, for example, as the hinge-toggle F, shaft C, and tappet 4—and the header P acts upon the ram O, carrying the die 16, and the holding-jaws M N are to be opened and closed by any suitable means as usual in bolt-machines, and the heading operation is to be performed by one, two, or more blows at the option of the attendant, and I provide a cutter $a$, which is received into the cross-bearer or breast-plate $b$, that is in front of the holding-jaws M N, and such cutter $a$ is preferably in a dove-tailed groove, as shown, and adjacent to the face of said holding-jaws M N, in order that such jaws M N may form a bed-shear for the cutter $a$ in acting to cut off the bolt, and in this form of machine the thickness of the holding-jaws M N will determine the length of bolt; but, if desired, the cutter $a$ will act against any bed-shear in the proper position for cutting off the bolt of the required length, and this cutter $a$ is actuated at the proper time by suitable mechanism under the control of the attendant. In the aforesaid patent there is a treadle S, the depression of which causes the holding-dies to grip the bolt-rod rigidly and cause the header to move the full stroke, and when released the bolt-rod is held with a less pressure and the header does not receive a full stroke, so that the last blow upon the head serves to remove the fin without producing another fin. We avail of this same treadle when the improvements are applied to this machine for the purposes of bringing into action the cutter $a$. With this object in view we have represented in the drawings the treadle S having a rearward extension S' and a spring $q$ for raising the treadle when the foot is taken off the same, and we have represented a rock-shaft $d$ in bearings $e$ upon the under side of the frame A, and on this rock-shaft is an arm $f$ to a connecting-rod $g$, pivoted to the cutter $a$, and upon this rock-shaft $d$ is a second arm $h$, to which is connected a pusher $k$, having a forked end adjacent to the cross-head E, and to this pusher a wire rope or chain L is connected, passing over the pulley M' upon the frame of the machine, and one end of this chain L is connected to the treadle-lever S' and the other end to the pusher $k$. It will now be understood that when the treadle S is depressed and the lever S' raised the pusher $k$ is lowered out of the way of the cross-head E in its reciprocations, and when the treadle S is released the spring $q$ raises the treadle S and moves the lever S' downwardly, drawing upon the chain L and raising the pusher $k$, so that its forked end is in the path of the cross-head E. Hence as said cross-head E completes its movement in finishing the bolt-head it carries with it the pusher $k$, which gives motion to the arm $h$, rock-shaft $d$, arm $f$, connecting-rod $g$, and cutter $a$, and separates the bolt from the bolt-rod, so that the bolt falls when the holding-dies are opened, and in so doing the machine is prepared for the reception of the bolt-rod, and the attendant places his foot upon the treadle S, so as to bring the parts fully into action and at the same time lower the pusher $k$ out of the path of the cross-head E, and the parts retain these positions during the forging of the bolt-head until the last blow is given to such bolt-head after the treadle S has been released and the pusher drawn into the path of the cross-head to effect the cutting operation, as before described.

We have herein spoken of these improvements in connection with bolt-machines; but they are not limited to machines that forge bolts, but are equally available with machines that forge rivets, the operations being similar. The treadle-lever is most convenient; but the lever that brings the cutter into action may be moved by hand.

We claim as our invention—

1. The combination, in a bolt or rivet machine, of the holding-dies, heading-die, and the mechanism for actuating the same, a cutter, and mechanism, substantially as specified, for bringing the cutter into action at the will of the attendant for separating the rod, substantially as set forth.

2. The combination, with the holding and heading dies in a bolt or rivet machine and the mechanism for actuating the same, of a cutter for separating the rod, and a lever under the control of the attendant for bringing the cutter into action as the forging is completed, substantially as set forth.

3. The combination, in a bolt or rivet machine, of holding and heading dies, and a cutter, a lever, and mechanism therewith connected for lessening the movement of the holding and heading dies and for bringing into action the cutting mechanism, substantially as set forth.

4. The method herein specified of forming bolts or rivets, consisting in feeding into the machine a heated rod, grasping the rod, and upsetting the metal to form the head by two or more blows and severing the rod while in the holding-dies, substantially as set forth.

5. The combination, with dies for grasping the rod and a heading-die, of a treadle, a cutter, a pusher acted upon by the cross-head of the heading-die, and a connection to the treadle for bringing the pusher into position for being acted upon by the cross-head, substantially as set forth.

6. The combination, with the holding and heading dies and the stationary cross-bar or breast-plate adjacent to the holding-dies, of a cutter received into a recess in the cross or breast-plate bar adjacent to the holding-dies, substantially as specified.

Signed by us this 6th day of May, A. D. 1891.

CHAS. HALL.
CHARLES E. HALL.

Witnesses:
GEO. T. PINCKNEY,
WILLIAM G. MOTT.